June 22, 1965  P. M. FIELD  3,190,174
SLIDE-ACTUATE SWITCH FOR PHOTOGRAPHIC PROJECTOR
Filed March 22, 1962  2 Sheets-Sheet 1

PHILIP M. FIELD
  INVENTOR.

BY
  ATTORNEY

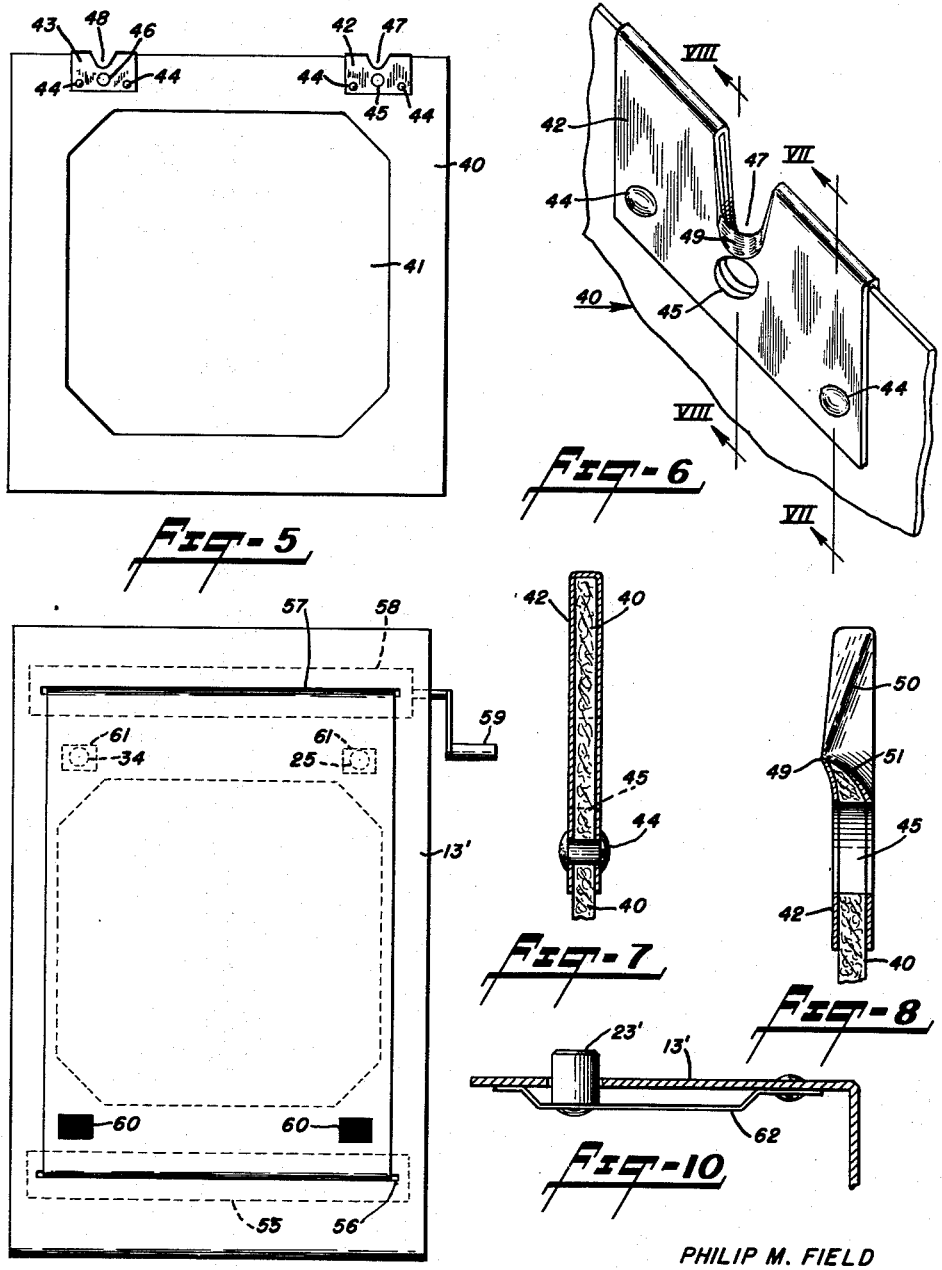

United States Patent Office 3,190,174
Patented June 22, 1965

3,190,174
SLIDE-ACTUATE SWITCH FOR PHOTOGRAPHIC PROJECTOR
Philip M. Field, Maplewood, N.J., assignor to Charles Beseler Company, East Orange, N.J., a partnership
Filed Mar. 22, 1962, Ser. No. 181,612
15 Claims. (Cl. 88—26)

This invention relates to photographic projectors and more particularly to a novel arrangement to facilitate the proper location of a slide on the projection stage of an overhead projector, which arrangement also includes automatic means for effecting a desirable energization and deenergization of the projector lamp during use of the projector.

Overhead projectors have a horizontal projection stage on which the slides to be projected are placed. Light from a condensing lens system is directed upwardly through the slide and to a lens-mirror combination which produces an image on a vertical screen behind the operator. Such projectors generally have a large projection stage which permits the operator to write on the slide (with a wax pencil or transparent ink) whereby such writing appears simultaneously on the screen. This, however, requires that some means be provided to retain the slide stationary during the act of writing thereon, otherwise the operator is obliged to hold the slide with his left hand and this interferes with the projection and, at best, is a nuisance.

It has been found advantageous to have the lamp of the projector turned off between the successive showing of slides so that the screen is not illuminated with a brilliant flash of light when the slide is removed from the projector, since this is distracting to the audience. One method of coping with this situation is for the operator to manually turn off the projector before the slide which has been projected is removed and to turn the projector on again after the new slide has been placed into position. It may here be pointed out that overhead projectors are generally operated in a room with a fairly high level of general illumination and, therefore, there is ample light for placement of the slide on the projection stage when the projector lamp is out. However, manual operation of the master projector switch has the disadvantage that the operator must concentrate upon the necessary sequence of operations and this he frequently fails to do.

In order to obviate this manual type of operation, automatic switches have been provided on the projector such that the physical act of placing the slide on the projection stage in one way or another actuates a switch and turns on the projector lamp. So, too, when the slide is removed from the projector stage, the projector lamp automatically is turned off. Prior arrangements of this type involved switch-actuating members (such as buttons, rollers, fingers, or etc.) normally extending onto the path of travel of the slide, whereby the forward edge of the slide effects movement of the sensing member to thereby close a microswitch in the electrical circuit of the projector lamp. The disadvantage of such arrangements lies primarily in the delicate adjustment of the switch-actuating mechanism in order to effect a positive on-off actuation of the projector lamp while, at the same time, adapting the mechanism for use on slides of different thicknesses. Further, the switch-actuating member either is carried on the top surface of the projection stage, or at least extends through a suitable opening provided in the projection stage. In consequence, the switch-actuating member interferes with other desirable uses of the projector and, also, often is damaged.

A slide-actuated switch arrangement made in accordance with this invention overcomes the shortcomings of existing arrangements and, at the same time, affords certain additional practical advantages. In brief, the invention to be described hereinbelow requires no physical contact between the slide and any part of the switch-actuating mechanism, its operation is independent of the thickness of the slide, and the upper surface of the projection stage is unencumbered with additional components. Further, the arrangement not only effects the desired control of the projector lamp, but it also holds the slide in proper position on the projection stage so that no other clamping means is required.

An object of this invention is the provision of an improved slide-actuated arrangement for automatically energizing the lamp of a projector as the slide is placed into position on the projection stage.

An object of this invention is the provision of a slide-actuated switch arrangement for an overhead projector which arrangement does not involve physical contact with the slide and which is independent of the thickness of the slide.

An object of this invention is the provision of an arrangement for automatic control of an overhead projector lamp which arrangement comprises cooperating magnetic material means carried by the projector and a slide of the matter to be projected, the said magnetic material means being effective to actuate an electrical switch when the slide is placed in operative position on the projector.

An object of this invention is the provision of an arrangement for effecting automatic control of the lamp of an overhead projector in accordance with the positioning of a slide on the projection stage, which arrangement also includes means for facilitating the proper positioning and holding of the slide in operative position.

An object of this invention is the provision of automatic means for deenergizing the lamp of an overhead projector upon removal of a slide from operative position on the projection stage, and including manually-operable means to render said automatic means ineffective.

These and other objects and advantages will become apparent from the following description when taken with the accompanying drawings illustrating several embodiments of the invention. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 5 is a plan view of a slide mount drawn to the same scale as FIGURE 2;

FIGURE 6 is an enlarged, fragmentary, isometric view showing one of the magnetic material tabs which are attached to the slide mount;

FIGURES 7 and 8 are cross sectional views taken along the lines VII—VII and VIII—VIII of FIGURE 6, respectively;

FIGURE 9 is a plan view of the projection stage and showing another embodiment of the invention; and FIGURE 10 is a fragmentary cross-sectional view showing a spring-biased locating pin particularly adapted for use with the FIGURE 9 embodiment of the invention.

Figure 1:
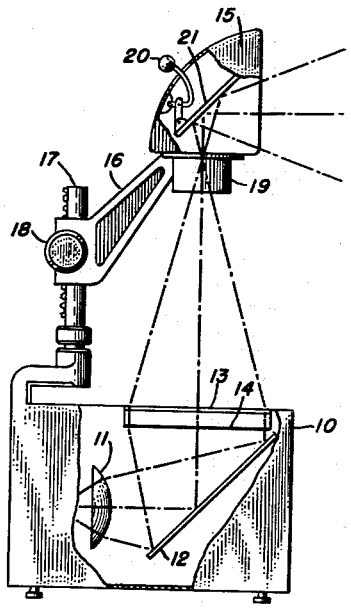
FIGURE 1 illustrates an overhead projector of the type particularly adapted for incorporation of the invention.

Reference, now, is made to FIGURE 1 wherein there is shown an overhead projector of conventional construction comprising a housing 10 which carries a lamp (not shown), a condensing lens 11, a tilted light-reflecting mirror 12, a projection stage 13, and a Fresnel lens 14. The optical system is such that a vertical light beam is directed through the transparent portion of the projection stage to a projection head 15 that is carried by an arm 16 that is slidably mounted on a post 17 extending upwardly from the housing. The spacing between the projection head 15 and the projection stage 13, for the purpose of focusing the image upon a vertical screen, is effected by rotation of the knob 18. The lens of the projection head is disposed within a barrel 19 and a handle 20 affords a means for changing the angular tilt of the mirror 21 for altering the elevation of the projected image.

The material to be projected is comprised of photographic film affixed to a cardboard mount and is referred to as a mounted slide. When the projector lamp is energized, the placement of the mounted slide upon the projection stage results in a projection of the material onto the screen, the projection stage having a transparent plate of a size and shape conforming to that of the exposed film area in the slide mount.

Figure 2:
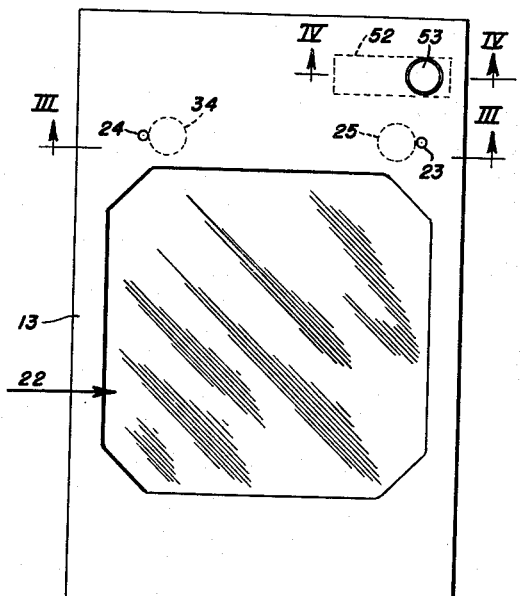
FIGURE 2 is a plan view of the projection stage, drawn to a larger scale.
Figure 3:
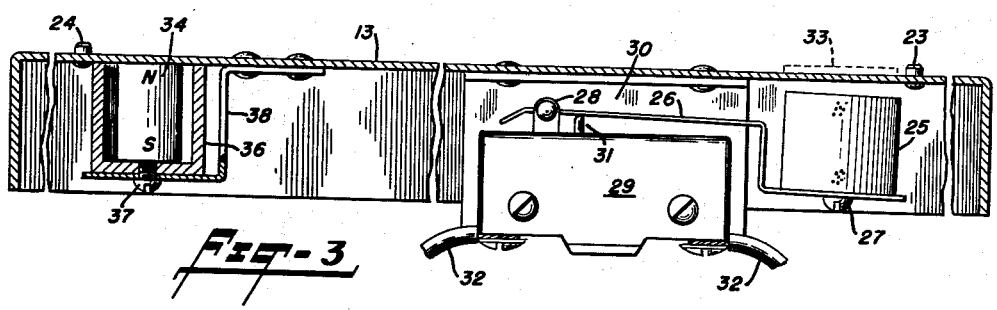
FIGURE 3 is a cross-sectional view taken along the line III—III of FIGURE 2.

FIGURE 2 is a plan view of the projection stage 13 which is a flat plate having an opening closed by a transparent plate 22 which is flush with the top surface of the plate, thereby forming a flat surface for support of a slide placed thereon. In the present instance, the plate is made of non-magnetic material, such as aluminum. A pair of locating pins 23, 24 are carried by the plate and extend upwardly from the surface thereof. These pins serve to properly locate the slide for projection purposes, as will be described hereinbelow. The mechanism for actuating an electric switch for controlling energization and deenergization of the projector lamp is a bar magnet 25 disposed below the plate 13, as shown in FIGURE 3, to which reference is now made.

The magnet 25 is secured to an arm 26, as by the screw 27, which arm is mounted for pivotal movement about a shaft carried by the bracket 28 which is secured to a micro switch 29. This switch is secured in fixed position relative to the plate 13 by means of the L-shaped mounting bracket 30. A biasing spring, not visible in the drawing, is assembled on the pivot shaft of the arm 26 in such manner that the arm normally is biased in a counterclockwise direction. The arrangement of the parts is such that the weight of the magnet 25 is sufficient to overcome the force of the spring urging the arm upwardly whereby the magnet is spaced from the plate 13 and the actuating pin 31 of the micro switch is in the depressed position. In such position of the actuating pin, the switch is in the open position. Thus, with the switch connected in series between the projector lamp and the voltage source, by the leads 32, the lamp will be deenergized. If, now, a soft-iron plate 33 is placed upon the plate 13 over the magnet 25, the magnet will be attracted thereto and will move into engagement with the lower surface of the plate. The corresponding counterclockwise rotation of the arm 26 permits the switch-actuating pin 31 to move upwardly (under the action of a self-contained spring contained within the switch housing) thereby closing the switch contacts and completing the electrical circuit to he projector lamp. Removal of the metal plate 33 results in a return of the magnet and the switch-actuating pin to the illustrated OFF position.

A similar permanent magnet 34 is mounted in fixed position proximate to the other locating pin 24, for purposes to be described below. As shown in the drawing, the magnet 34 is cylindrical and is contained within a metal casing, of non-magnetic material, provided with a threaded hole to receive the screw 37 whereby the magnet is secured in position by means of a simple bracket 38. It is here pointed out that the magnet 25 is of similar shape and construction although it will be apparent that permanent magnets of other shapes and other specific mounting arrangements may be utilized.

The upward displacement of the magnet 25 to cause a closure of the switch contacts when a slide is properly positioned on the projection stage, is effected by a soft-iron plate secured to the slide mount as will now be described with reference to FIGURES 5–8. Here, the slide mount 40, generally made of cardboard, carries the film 41 having an exposed portion corresponding to the opening in the projection stage. A pair of relatively thin, soft-iron plates 42, 43 are bent over the forward edge of the mount and secured thereto as by rivets 44. The holes 45, 46 extend through the respective plates and the mount material, said holes each having a diameter slightly larger than the locating pins (see pins 23, 24, in FIGURE 2) and the spacing between the holes corresponds to that of said pins. In order to facilitate the placement of the slide on the surface of the projection stage, the metal plates 42, 43 are provided with V-shaped notches, or slots 47, 48, respectively. In forming these slots, the lower, front portion thereof is bulged outwardly slightly, as indicated by the reference numeral 49 in FIGURES 6 and 8. This results in two sloping surfaces extending in opposite directions from the bulge 49 toward the rear surface of the mount. These sloping surfaces 50, 51 are best show in FIGURE 8, which is a cross-sectional view taken along the line VIII—VIIII of FIGURE 6.

When the mounted slide of FIGURE 5 is slidably moved along the surface of the projection stage, the V-shaped notches 47, 48 serve to align the slide with the locating pins 23 and 24 shown in FIGURE 2 and the underlying sloping surfaces guide the locating pins into the mount holes 45, 46. This results in the proper positioning of the slide. At the same time, the mount plates are disposed in the magnetic fields of the two permanent magnets. In the case of the movable magnet 25, the magnetic force results in an upward displacement of the magnet and a closure of the switch in the lamp circuit. Also, the magnetic attraction between the magnet and the plate holds the slide mount against the surface of the projection stage. Similarly, the fixed magnet 34 holds down the left corner of the slide mount. Once the two locating pins are disposed within the holes of the mount plates, lateral movement of the slide is prevented.

Although the described construction of the holes and the V-slots in the soft-iron plates of the slide mount is preferred, it is apparent that the holes may be omitted leaving only the V-slots for the proper positioning of the slide. In such case, the base of each V-slot would be semi-circular and of a radius somewhat greater than the diameter of the locating pins. In such arrangement, the force of the magnetic attraction normally will prevent undesirable sliding movement of the slide along the supporting surface, but a forceful sliding pressure exerted upon the slide by the operator may result in displacement of the slide.

It will now be apparent that the placement of the slide in proper position automatically turns the projector lamp on and the removal of the slide turns the lamp off. This has been found to be a practical operation. However, it is recognized that this type of use of a projection lamp is injurious to the lamp in that the in-rush current and thermal fatigue tend to shorten its operating life. Thus, instead of turning the lamp on and off completely, the switch can control the connection of an appropriate resistor into the lamp circuit. When the switch is in the open position, as shown in FIGURE 3, the resistor is effective to lower the lamp voltage but permits the filament to remain heated. Closure of the switch upon placement of a slide into position, shorts out the resistor permitting the lamp to operate at full brilliance. Further, although projectors of this type are generally used in rooms having fairly high ambient light, in some applications they are used in completely darkened rooms. In this circumstance, the above-described switch can, simultaneously with the turning off of the main projector lamp, turn on an auxiliary reading lamp to provide sufficient illumination for the operator of the projector to place the slides into operating position.

Figure 4:
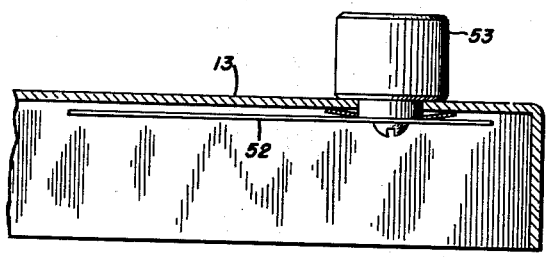
FIGURE 4 is a cross-sectional view taken along the line IV—IV of FIGURE 2.

There may be occasion when the operator of the projector does not wish the projector lamp to be turned off upon removal of the slide. For this purpose, I provide manually-operable means to render ineffective the magnet-actuate switch, as shown in FIGURES 2 and 4. A soft-iron plate 52 is disposed below the projection stage and is secured to a finger-operable knob 53. When the plate 52 is in the position shown in FIGURE 2, it has no effect upon the movable magnet 25. However, a counterclockwise rotation of the knob 53 will bring the plate over the magnet. The plate 52 is sufficiently rigid to prevent flexing thereof and it operates in a plane close to the inner surface of the projection stage 13. Consequently, the magnet 25 is displaced upwardly, thereby retaining the control switch closed irrespective of the presence or absence of a slide on the projection stage.

Overhead projectors are frequently used with a plastic roll, that is, a roll of transparent cellophane, cellulose acetate or similar material which is passed over the projection stage. The operator can write upon this material and whatever he has written is projected on the screen. Also, sometimes the transparent sheet is passed over a slide being projected so that the lecturer can superpose written modifications in the projected material.

FIGURE 9 is a plan view of the projection stage 13' having the conventional light-transmitting opening therein. The sheet of transparent material passes from a supply roll 55, upwardly through a slot 56, over the stage and downwardly through a slot 57 to a take-up roll 58. The latter is rotatable by means of a hand crank 59 to advance the transparent material over the projection stage. Strips 60, 61, of magnetic material, are applied to the transparent material at properly-spaced points, the strips 61 being shown in dotted lines to permit a showing of the underlying permanent magnets 25 and 34. When the operator has completed his writing on the material overlying the projection area, he can rotate the crank 59 to advance the plastic material from the supply roll to the take-up roll. As the upper magnetic strips 61 pass out the magnetic field of the magnets, the magnet 25 drops away from the surface of the plate 13' causing an opening of the switch and extinguishing the projector light. As a clean portion of the plastic material is brought into position, the lower magnetic material strips will overlie the magnets and the magnet 25 will be attracted to its upper position, thereby energizing the lamp. With the magnetic material strips spaced along the entire roll of the plastic material, it will be clear that the lamp is deenergized during a time period beginning shortly after operation of the crank until a clean portion of the plastic material is in position for use.

The locating pins 23 and 24 described with specific reference to the FIGURE 2 embodiment of the invention are fixed in position on the plate forming the projection stage. Such pins extend only a small distance above the projection stage surface, in fact, such distance need be no greater than the thickness of the slide mount. Fixed locating pins of this type can be incorporated in the FIGURE 9 embodiment of the invention without materially interfering with the normal movement and use of the plastic sheet material. However, in order to retain the plastic sheet in contact with the projection stage surface throughout the entire exposed length of the sheet, the locating pins can be spring biased, as shown in FIGURE 10. Here, the locating pin 23' passes through a clearance hole formed in the plate 13' and is affixed to the free end of a relatively weak leaf spring 62. In this construction, the locating pins are depressed by the plastic sheet. When the plastic sheet is removed for the projection of slides, the pins extend upwardly from the plate 13' and serve the same functions as the described fixed pins.

Having now described the invention, those skilled in this art will have no difficulty making changes and modifications in the illustrated construction and operative assembly of the parts in order to adapt the invention to a specific application. It is intended that such changes and modifications shall fall within the scope and spirit of the invention, as recited in the following claims.

I claim:

1. In a photographic projector of the type wherein a switch in the lamp circuit is actuated by the placement into operative position of a member carrying the material to be projected, the improvement wherein the switch actuating means are cooperating magnetic material members carried by the projector and the said member, one of the magnetic material members being a magnet.

2. An overhead projector of the class consisting of a projection stage for supporting a member carrying the material to be projected, a lamp, a switch controlling the energization of the lamp, and means automatically actuating the switch when the said member is positioned in operative position on the projection stage, characterized in that the means automatically actuating the switch comprises cooperating magnetic material means carried by the projection stage and the said member, one of the magnetic material means being a permanent magnet.

3. An arrangement for automatically actuating a switch in the lamp circuit of a photographic projector in accordance with the placement of a member carrying material to be projected into operative position on the projector, said arrangement comprising,
 (a) first magnetic material means carried by the projector,
 (b) second material means carried by the said member and adapted for magnetic coupling with the first magnetic material means when the member is in the said operative position, and
 (c) means effective upon magnetic coupling of the said first and second magnetic material means for actuation of said switch.

4. The invention as recited in claim 3 wherein the first magnetic material means is a permanent magnet movable from a first position to a second position when magnetically coupled to the second magnetic material means.

5. The invention as recited in claim 3, wherein the said member is a photographic slide.

6. The invention as recited in claim 3, wherein the said member is a transparent sheet carrying a plurality of said second magnetic material means spaced a predetermined distance apart along a side edge thereof.

7. In an overhead projector of the class wherein a light beam from a lamp passes through a projection stage adapted to support a removable member carrying matter to be projected, the combination of,
 (a) a permanent magnet disposed below the projection stage,
 (b) means supporting the magnet for displacement between two positions,
 (c) an electric switch connected in the lamp circuit,
 (d) means mechanically coupling the magnet to the switch for actuation thereof in accordance with displacement of the magnet, and
 (e) a magnetic material member secured to the said removable member, said magnetic material member being effective to displace the magnet by magnetic attraction when the said removable member is placed in a predetermined position on the projection stage.

8. The invention as recited in claim 7, including,
 (f) a locating pin extending upwardly from the projection stage, and
 (g) means forming an opening in the said magnetic material member for receiving said pin when the said member is in the operative position.

9. The invention as recited in claim 8 wherein the locating pin is spring-biased normally to the extended position.

10. The invention as recited in claim 8, wherein an edge of said magnetic material member is provided with a generally V-shaped slot for guiding the pin into the said opening as the said member is slidably moved into operative position on the projection stage.

11. The invention as recited in claim 7, including manually-operable means carried by the projector and movable to cause actuation of said switch independently of the said magnetic material member.

12. In an overhead projector of the class wherein a light beam from a lamp passes through a projection stage adapted to support a removable member carrying material to be projected, the combination of,
(a) a first permanent magnet disposed below the projection stage,
(b) means supporting the magnet for displacement between two positions,
(c) an electric switch connected in the lamp circuit,
(d) means mechanically coupling the said first magnet to the switch for actutaion thereof in accordance with displacement of said magnet,
(e) a second permanent magnet disposed below the projection stage in fixed position and spaced from the first magnet, and
(f) a pair of correspondingly-spaced magnetic material members secured to the said removable member, said magnetic material members being magnetically coupled to the respective magnets when the said removable member is placed in operative position on the projection stage, with one of the magnetic material members effecting a displacement of the first magnet thereby to actuate said switch.

13. The invention as recited in claim 12, including a pair of locating pins extending upwardly from the projection stage, and wherein each said magnetic material member is provided with an opening for receiving the corresponding locating pin when the said removable member is in the operative position.

14. The invention as recited in claim 12, including manually-operable means carried by the projector and movable to cause actuation of said switch independently of the said magnetic material members.

15. In an overhead projector of the class comprising a lamp, means directing light from the lamp through a projection stage, a transparent sheet passing from a supply roll over the projection stage to a take-up roll, and manually operable means for moving the sheet from the supply roll to the take-up roll, a combination of,
(a) a first permanent magnet disposed below the projection stage and mounted for displacement between two positions,
(b) an electric switch connected in the lamp circuit and actuated in accordance with displacement of said first magnet,
(c) a second permanent magnet disposed in fixed position below the projection stage,
(d) a first set of spaced magnetic material means carried by the sheet along one edge, and
(e) a second set of spaced magnetic material means carried by the sheet along the other edge, the arrangement being such that movement of the sheet over the projection stage successively brings the sets of magnetic material means into the magnetic field of the associated one of the permanent magnets with a resulting displacement of the first permanent magnet.

References Cited by the Examiner
UNITED STATES PATENTS

| | | | |
|---|---|---|---|
| 1,930,421 | 10/33 | Ehmer | 88—26 |
| 1,943,533 | 1/34 | Hubschmann | 88—26 |
| 2,268,529 | 12/41 | Stiles | 40—152 |
| 2,713,294 | 7/55 | Padgett | 95—76 |
| 2,871,600 | 2/59 | Woodruff | 40—152 |
| 2,924,682 | 2/60 | Winterburn | 200—87 |
| 3,017,473 | 1/62 | Verger | 200—87 |
| 3,053,146 | 9/62 | King | 88—28 |

NORTON ANSHER, *Primary Examiner.*
EMIL G. ANDERSON, ROBERT EVANS,
*Examiners.*